United States Patent
Raghavan et al.

(10) Patent No.: US 11,502,733 B2
(45) Date of Patent: Nov. 15, 2022

(54) SWITCHING BETWEEN RANK TWO AND RANK FOUR OPERATING MODES FOR ANALOG BEAMFORMING

(71) Applicant: QUALCOMM Incorporated, San Diego, CA (US)

(72) Inventors: Vasanthan Raghavan, West Wndsor Township, NJ (US); Juergen Cezanne, Ocean Township, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 17/171,734

(22) Filed: Feb. 9, 2021

(65) Prior Publication Data

US 2022/0255600 A1 Aug. 11, 2022

(51) Int. Cl.
*H04B 7/06* (2006.01)
*H04B 7/0456* (2017.01)
*H04B 17/318* (2015.01)
*H04L 5/00* (2006.01)

(52) U.S. Cl.
CPC ......... *H04B 7/0486* (2013.01); *H04B 7/0617* (2013.01); *H04B 17/318* (2015.01); *H04L 5/0048* (2013.01)

(58) Field of Classification Search
CPC .. H04B 7/0486; H04B 7/0617; H04B 17/318; H04L 5/0048
See application file for complete search history.

(56) References Cited

U.S. PATENT DOCUMENTS

2017/0134083 A1* 5/2017 Kim .................... H04B 7/0417

FOREIGN PATENT DOCUMENTS

EP 3562055 A1 10/2019
WO 2018175727 A1 9/2018

OTHER PUBLICATIONS

International Search Report and Written Opinion—PCT/US2022/070527—ISA/EPO—dated May 20, 2022.

* cited by examiner

Primary Examiner — Minh Trang T Nguyen
(74) Attorney, Agent, or Firm — Harrity & Harrity, LLP

(57) ABSTRACT

Various aspects of the present disclosure generally relate to wireless communication. In some aspects, a first wireless communication device may receive, from a second wireless communication device, a set of beamformed reference signals for analog beam training. The first wireless communication device may transmit, to the second wireless communication device, feedback that indicates a first complex correlation coefficient associated with the first wireless communication device that is based at least in part on the set of beamformed reference signals and that represents a phase between a first beamforming vector and a second beamforming vector, and an angle between the first beamforming vector and the second beamforming vector. Numerous other aspects are described.

44 Claims, 8 Drawing Sheets

SWITCHING BETWEEN RANK TWO AND RANK FOUR OPERATING MODES FOR ANALOG BEAMFORMING

FIELD OF THE DISCLOSURE

Aspects of the present disclosure generally relate to wireless communication and to techniques and apparatuses for switching between rank two and rank four operating modes for analog beamforming.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a B S via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a first wireless communication device for wireless communication includes a memory; and one or more processors coupled to the memory, the memory and the one or more processors configured to: receive, from a second wireless communication device, a set of beamformed reference signals for analog beam training; and transmit, to the second wireless communication device, feedback that indicates a first complex correlation coefficient associated with the first wireless communication device that is based at least in part on the set of beamformed reference signals and that represents: a phase between a first beamforming vector used for beamforming at the first wireless communication device based at least in part on a first beamformed reference signal of the set of beamformed reference signals and a second beamforming vector used for beamforming at the first wireless communication device based at least in part on a second beamformed reference signal of the set of beamformed reference signals; and an angle between the first beamforming vector and the second beamforming vector.

In some aspects, a first wireless communication device for wireless communication includes a memory; and one or more processors coupled to the memory, the memory and the one or more processors configured to: transmit, to a second wireless communication device, a set of beamformed reference signals for analog beam training; and receive, from the second wireless communication device, feedback that indicates a first complex correlation coefficient associated with the second wireless communication device that is based at least in part on the set of beamformed reference signals and that represents: a phase between a first beamforming vector used for beamforming at the second wireless communication device based at least in part on a first beamformed reference signal of the set of beamformed reference signals and a second beamforming vector used for beamforming at the second wireless communication device based at least in part on a second beamformed reference signal of the set of beamformed reference signals; and an angle between the first beamforming vector and the second beamforming vector.

In some aspects, a method of wireless communication performed by a first wireless communication device includes receiving, from a second wireless communication device, a set of beamformed reference signals for analog beam training; and transmitting, to the second wireless communication device, feedback that indicates a first complex correlation coefficient associated with the first wireless communication device that is based at least in part on the set of beamformed reference signals and that represents: a phase between a first beamforming vector used for beamforming at the first wireless communication device based at least in part on a first beamformed reference signal of the set of beamformed reference signals and a second beamforming vector used for beamforming at the first wireless communication device based at least in part on a second beamformed reference signal of the set of beamformed reference signals; and an angle between the first beamforming vector and the second beamforming vector.

In some aspects, a method of wireless communication performed by a first wireless communication device includes transmitting, to a second wireless communication device, a set of beamformed reference signals for analog beam training; and receiving, from the second wireless communication device, feedback that indicates a first complex correlation coefficient associated with the second wireless communication device that is based at least in part on the set of beamformed reference signals and that represents: a phase between a first beamforming vector used for beamforming at the second wireless communication device based at least in part on a first beamformed reference signal of the set of beamformed reference signals and a second beamforming vector used for beamforming at the second wireless communication device based at least in part on a second beamformed reference signal of the set of beamformed reference signals; and an angle between the first beamforming vector and the second beamforming vector.

In some aspects, a non-transitory computer-readable medium storing a set of instructions for wireless communication includes one or more instructions that, when executed by one or more processors of a first wireless communication device, cause the first wireless communication device to: receive, from a second wireless communication device, a set of beamformed reference signals for analog beam training; and transmit, to the second wireless communication device, feedback that indicates a first complex correlation coefficient associated with the first wireless communication device that is based at least in part on the set of beamformed reference signals and that represents: a phase between a first beamforming vector used for beamforming at the first wireless communication device based at least in part on a first beamformed reference signal of the set of beamformed reference signals and a second beamforming vector used for beamforming at the first wireless communication device based at least in part on a second beamformed reference signal of the set of beamformed reference signals; and an angle between the first beamforming vector and the second beamforming vector.

In some aspects, a non-transitory computer-readable medium storing a set of instructions for wireless communication includes one or more instructions that, when executed by one or more processors of a first wireless communication device, cause the first wireless communication device to: transmit, to a second wireless communication device, a set of beamformed reference signals for analog beam training; and receive, from the second wireless communication device, feedback that indicates a first complex correlation coefficient associated with the second wireless communication device that is based at least in part on the set of beamformed reference signals and that represents: a phase between a first beamforming vector used for beamforming at the second wireless communication device based at least in part on a first beamformed reference signal of the set of beamformed reference signals and a second beamforming vector used for beamforming at the second wireless communication device based at least in part on a second beamformed reference signal of the set of beamformed reference signals; and an angle between the first beamforming vector and the second beamforming vector.

In some aspects, an apparatus for wireless communication includes means for receiving, from a wireless communication device, a set of beamformed reference signals for analog beam training; and means for transmitting, to the wireless communication device, feedback that indicates a first complex correlation coefficient associated with the apparatus that is based at least in part on the set of beamformed reference signals and that represents: a phase between a first beamforming vector used for beamforming at the apparatus based at least in part on a first beamformed reference signal of the set of beamformed reference signals and a second beamforming vector used for beamforming at the apparatus based at least in part on a second beamformed reference signal of the set of beamformed reference signals; and an angle between the first beamforming vector and the second beamforming vector.

In some aspects, an apparatus for wireless communication includes means for transmitting, to a wireless communication device, a set of beamformed reference signals for analog beam training; and means for receiving, from the wireless communication device, feedback that indicates a first complex correlation coefficient associated with the wireless communication device that is based at least in part on the set of beamformed reference signals and that represents: a phase between a first beamforming vector used for beamforming at the wireless communication device based at least in part on a first beamformed reference signal of the set of beamformed reference signals and a second beamforming vector used for beamforming at the wireless communication device based at least in part on a second beamformed reference signal of the set of beamformed reference signals; and an angle between the first beamforming vector and the second beamforming vector.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
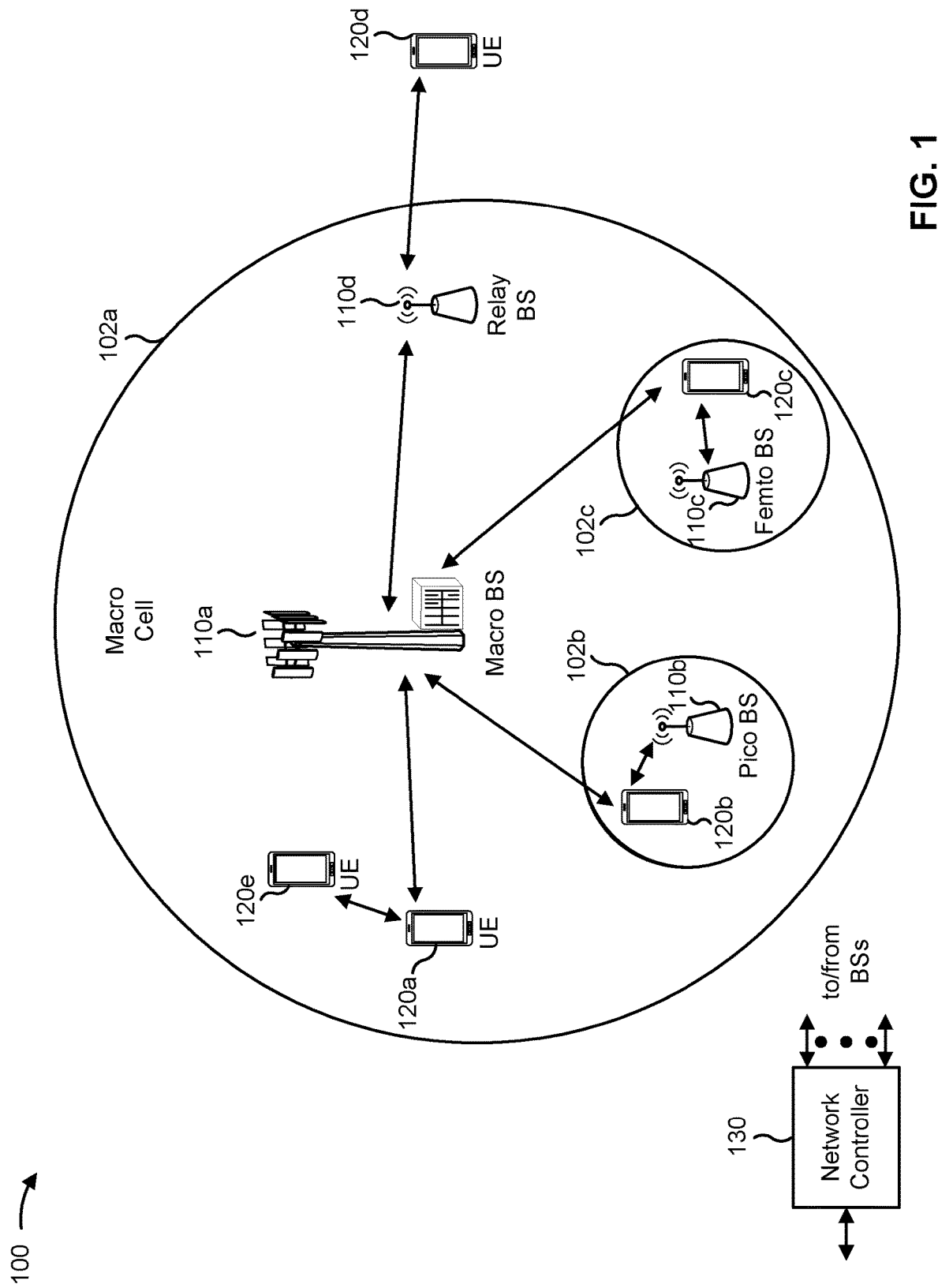
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
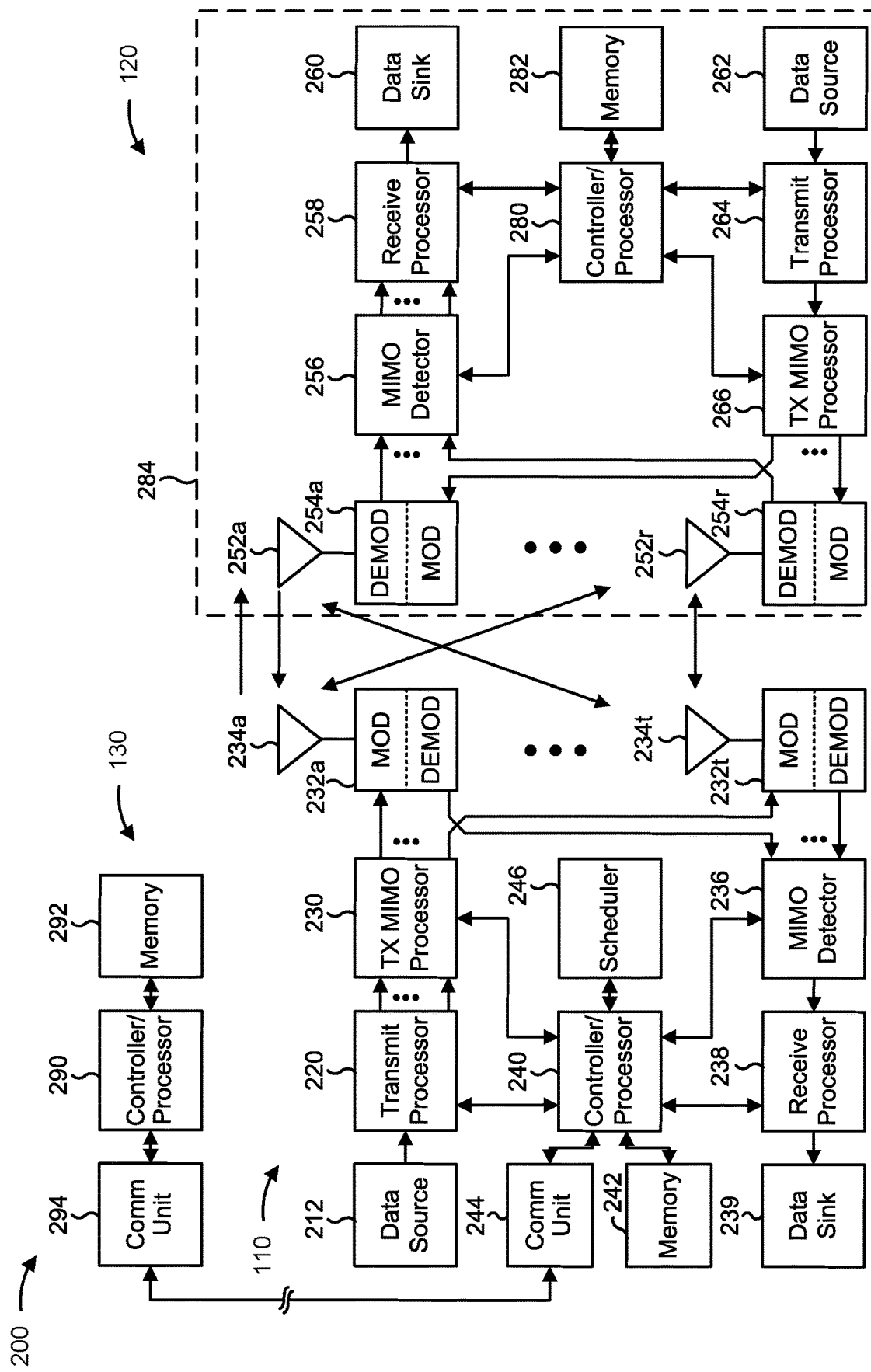
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-7.

Controller/processor 240 of base station 110, controller/processor 280 of UE 120, and/or any other component(s) of FIG. 2 may perform one or more techniques associated with switching between rank two and rank four operating modes for analog beamforming, as described in more detail elsewhere herein. In some aspects, the wireless communication device described herein is the base station 110, is included in the base station 110, or includes one or more components of the base station 110 shown in FIG. 2. In some aspects, the wireless communication device described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the first wireless communication device includes means for receiving, from a second wireless communication device, a set of beamformed reference signals for analog beam training; or means for transmitting, to the second wireless communication device, feedback that indicates a first complex correlation coefficient associated with the first wireless communication device that is based at least in part on the set of beamformed reference signals and that represents: a phase between a first beamforming vector used for beamforming at the first wireless communication device based at least in part on a first beamformed reference signal of the set of beamformed reference signals and a second beamforming vector used for beamforming at the first wireless communication device based at least in part on a second beamformed reference signal of the set of beamformed reference signals; or an angle between the first beamforming vector and the second beamforming vector. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless communication device includes means for receiving, from the second wireless communication device, an indication of a rank switch from a first rank operating mode to a second rank operating mode, wherein the rank switch is based at least in part on a signal strength threshold, wherein the signal strength threshold is based at least in part on the first complex correlation coefficient, a second complex correlation coefficient associated with the second device, the first signal strength, the second signal strength, and the beam information.

In some aspects, the first wireless communication device includes means for receiving, from the second wireless communication device, an enhanced beam training configuration that indicates an additional set of beamformed reference signals for beam training associated with the second rank operating mode.

In some aspects, the first wireless communication device includes means for transmitting, to a second wireless communication device, a set of beamformed reference signals for analog beam training; or means for receiving, from the second wireless communication device, feedback that indicates a first complex correlation coefficient associated with the second wireless communication device that is based at least in part on the set of beamformed reference signals and that represents: a phase between a first beamforming vector used for beamforming at the first wireless communication device based at least in part on a first beamformed reference signal of the set of beamformed reference signals and a second beamforming vector used for beamforming at the second wireless communication device based at least in part on a second beamformed reference signal of the set of beamformed reference signals; or an angle between the first beamforming vector and the second beamforming vector. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless communication device includes means for determining a signal strength threshold based at least in part on the first complex correlation coefficient, a second complex correlation coefficient associated with the second device, the first signal strength, the second signal strength, and the beam information.

In some aspects, the first wireless communication device includes means for determining an occurrence of a rank switch trigger event based at least in part on determining that an operating signal strength satisfies the signal strength threshold.

In some aspects, the first wireless communication device includes means for transmitting, to the second wireless communication device, an indication of a rank switch from a first rank operating mode to a second rank operating mode, wherein the rank switch is based at least in part on determining the occurrence of the rank switch trigger event.

In some aspects, the first wireless communication device includes means for transmitting, to the second wireless communication device, an enhanced beam training configuration that indicates an additional set of beamformed reference signals for beam training associated with the second rank operating mode.

In some aspects, the first wireless communication device includes means for determining a realizable data rate associated with the second rank operating mode; or means for scheduling the second wireless communication device and at least a third wireless communication device based at least in part on the realizable data rate.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
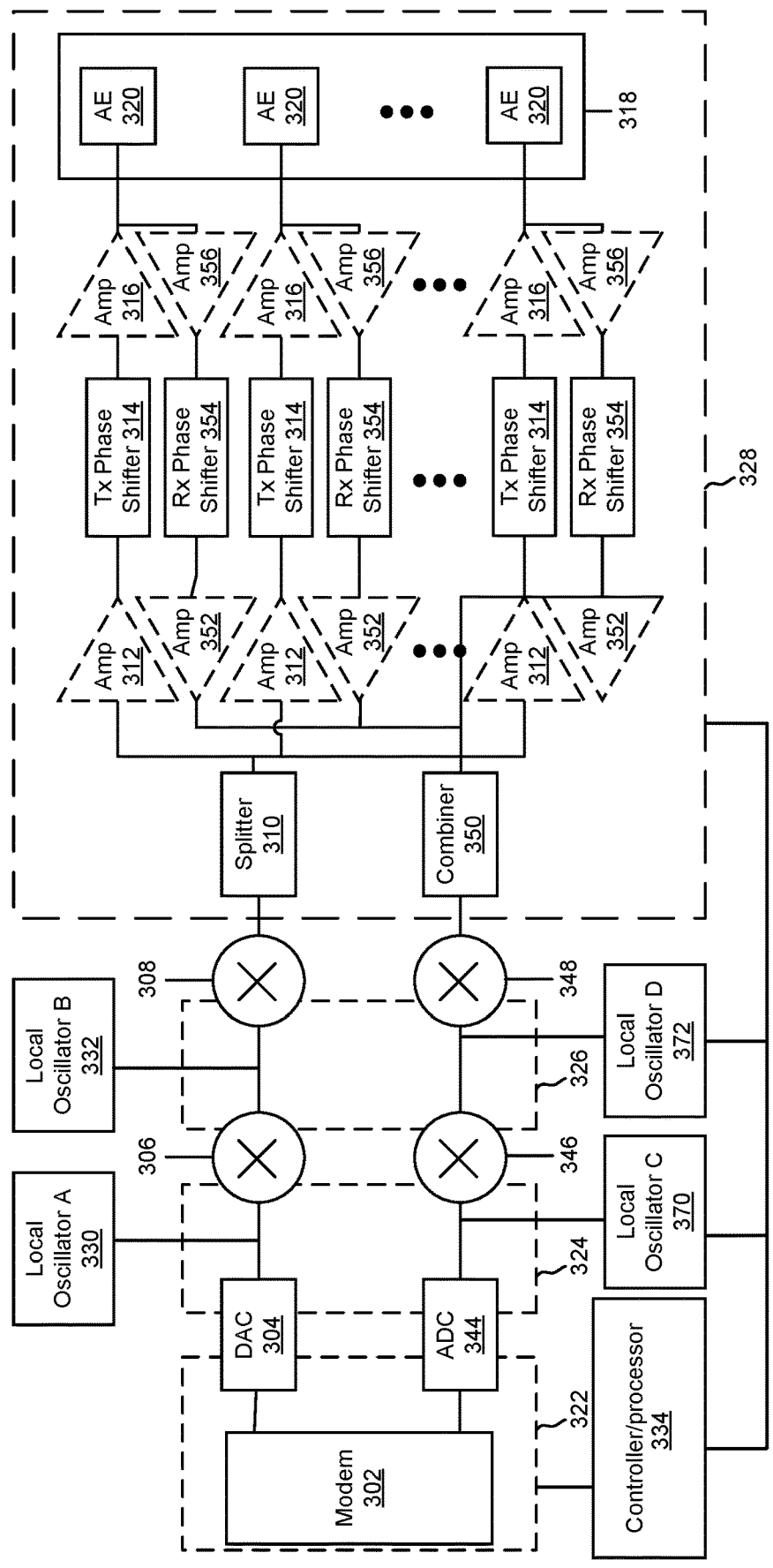
FIG. 3 is a diagram illustrating an example beamforming architecture that supports beamforming for millimeter wave (mmW) communications, in accordance with the present disclosure.

FIG. 3 is a diagram illustrating an example beamforming architecture 300 that supports beamforming for millimeter wave (mmW) communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with the present disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply, and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 are present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signals into a combined signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 346 and 348. Mixers 346 and 348 generally downconvert the received RF signal using inputs from local oscillators 370 and 372, respectively, to create intermediate or baseband signals that carry the encoded and modulated information. The output of the mixers 346 and 348 are input into an analog-to-digital converter (ADC) 344 for conversion to analog signals. The analog signals output from ADC 344 is input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
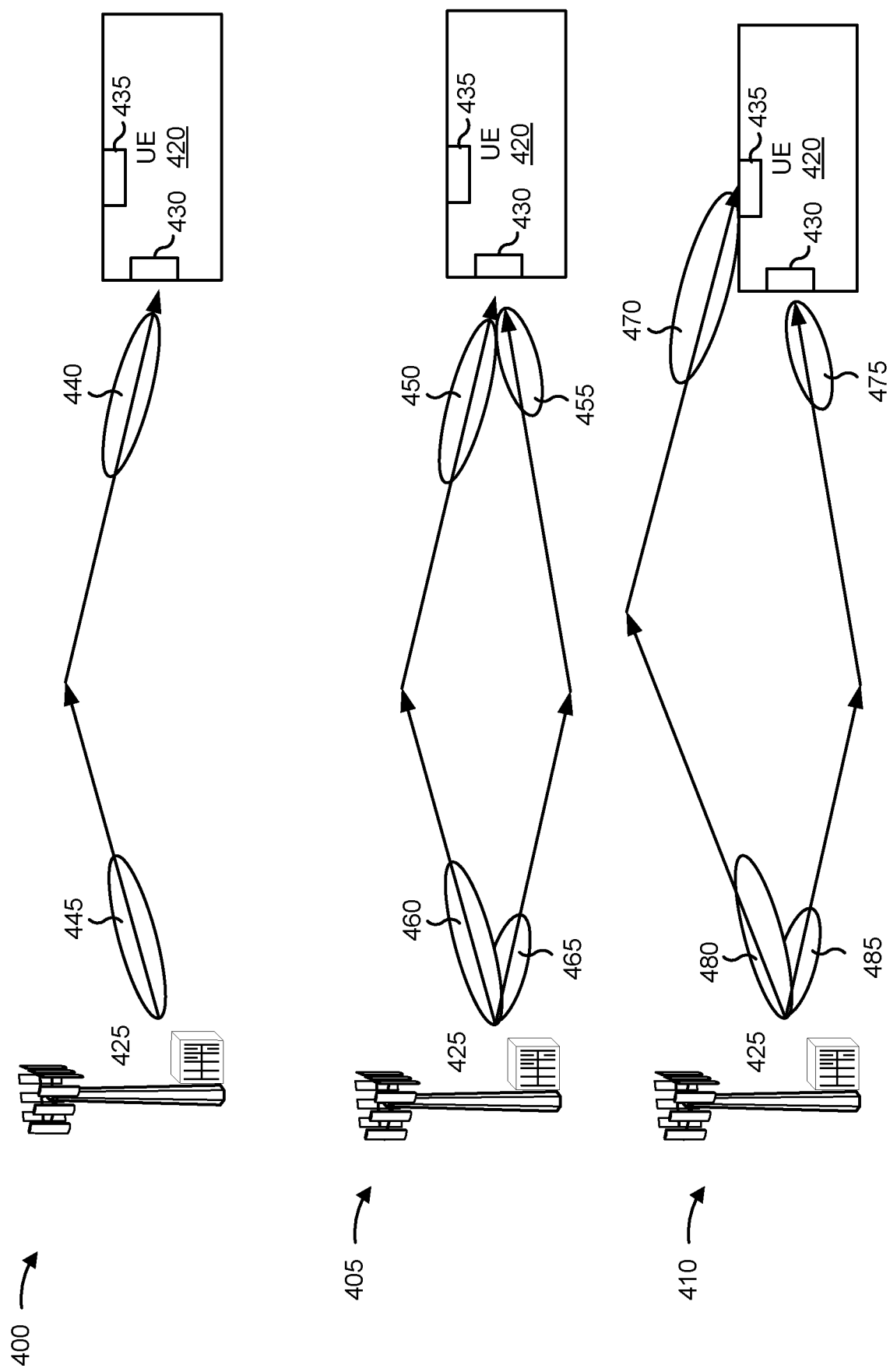
FIG. 4 is a diagram illustrating an example associated with analog beamforming, in accordance with the present disclosure.

FIG. 4 is a diagram illustrating examples 400, 405, and 410 of analog beamforming, in accordance with the present disclosure. As shown in FIG. 4, examples 400, 405, and 410 include a UE 420 in communication with a base station 425 in a wireless network (e.g., wireless network 100). However, the devices shown in FIG. 4 are provided as examples, and the wireless network may support communication and beam management between other devices (e.g., between a UE 420 and a base station 425 or TRP, between a mobile termination node and a control node, between an integrated access and backhaul (IAB) child node and an IAB parent node, and/or between a scheduled node and a scheduling node). In some aspects, the UE 420 and the base station 425 may be in a connected state (e.g., a radio resource control (RRC) connected state). As is further shown in FIG. 4, the UE 420 may include a first antenna module 430 and a second antenna module 435. In some aspects, the UE 420 may include any number of additional antenna modules.

As shown in FIG. 4, example 400 may be an example of rank two (which may be indicated, interchangeably, as "rank-2") beamforming. As shown, the UE 420 may identify a best beam 440 over two polarizations from a codebook maintained at the UE 420. Similarly, the base station 425 may identify a best beam 445 over two polarizations from a codebook maintained at the base station 425. In a rank two operating mode, beamforming is performed using two RF chains for polarization-based transmissions.

In a rank four operating mode, a device may use four RF chains for polarization-based transmissions over two beams (spatial directions). In some aspects, as shown by example 405, the RF chains may be used within one antenna module. This may be referred to as intra-module beamforming. As shown, for example, the UE 420 may determine, using the first antenna module 430, a best beam 450 over two polarizations and a second best beam 455 over two polarizations. Similarly, the base station 425 may determine a best beam 460 (corresponding to the best beam 450) and a second best beam 465 (corresponding to the second best beam 455). These best beams may be chosen to maximize signal strength (e.g., reference signal received power (RSRP)), whereas the second best beams may be second best from a signal strength perspective.

In some aspects, as shown by example 410, the RF chains may be used across more than one antenna module. This may be referred to as inter-module beamforming. As shown, for example, the UE 420 may determine, using the second antenna module 435, a best beam 470 over two polarizations and, using the first antenna module 430, a second best beam 475 over two polarizations. Similarly, the base station 425 may determine a best beam 480 (corresponding to the best beam 470) and a second best beam 485 (corresponding to the second best beam 475).

In some cases, a UE may transmit feedback indicating a rank indicator (RI), a precoding matrix indicator (PMI) and a CQI for precoding operations. For precoding, a fixed codebook of a finite number of precoders of different ranks may be considered. The UE may evaluate the realizable rate with these different (but finite number of) precoders and transmit feedback indicating an RI and a PMI (e.g., best rank and best precoder matrix from the class) as well as a MCS that is useful as CQI. In practice, a wireless communication device may not necessarily be constrained in terms of its precoding matrix choice, which may lead to a non-codebook operation. However, without an agreement in terms of the precoders, it becomes difficult for another wireless communication device to determine which precoder to use.

Some aspects of the subject matter disclosed herein may provide a generalized rank indication for non-codebook operations. To facilitate the generalized rank indication, some aspects involve the feedback of a complex correlation coefficient associated with beams in the codebook. In some aspects, a rank switch trigger event is provided so that a wireless communication device may determine when to switch between a rank two operation mode and a rank four operation mode (or vice versa). Dynamic switching to the higher rank transmissions may lead to better data rates and diversity. By determining an occurrence of the rank switch trigger event based at least in part on the complex correlation coefficient, some aspects may facilitate improving spectral efficiency and data rates.

The complex correlation coefficient may be determined as an approximation to a solution of an analysis that identifies an optimal transition signal to noise ratio (SNR). For example, if H denotes the $N_r \times N_t$ channel matrix between a base station and a UE with a total Tx power constraint of $\rho$, the analysis seeks to identify a transition from rank-1 spatial MIMO to rank-2 spatial MIMO (which gets scaled up over two polarizations as rank-2 to rank-4). Under a perfect channel state information (CSI) assumption at both ends of the communication, the data rate with rank-1 spatial MIMO is given as $$R_1 = \log_2(1 + \rho \cdot \lambda_1(H^H H)),$$

where $\lambda_1(H^H H)$ denotes the dominant squared singular value of H. The data rate with rank-2 spatial MIMO is given as $$R_2 = \log_2\left(1 + \frac{\rho}{2} \cdot \lambda_1(H^H H) \cdot D_1\right) + \log_2\left(1 + \frac{\rho}{2} \cdot \lambda_2(H^H H) \cdot D_2\right),$$

where $\lambda_1(H^H H)$ and $\lambda_2(H^H H)$ denote the dominant and second dominant squared singular values of H and, and $D_i$ is the waterfilling power allocation (v is the water level and optimized) which is given as $$D_i = \left(v - \frac{1}{\lambda_i(H^H H)}\right)^+,$$

where v is chosen such that $D_1 + D_2 \leq 2$.

The analysis is configured to identify a $\rho$ such that $R_2 \geq R_1$. This is the smallest SNR (denoted as the transition SNR) at which rank-2 spatial MIMO becomes optimal. Solving for the transition SNR leads to a quadratic equation in $\rho$ which results in $$\rho \geq \frac{\lambda_1(H^H H) - \lambda_2(H^H H)}{\lambda_1(H^H H) \cdot \lambda_2(H^H H)}.$$

This mathematical result is not easily practically implementable. Some aspects of the subject matter disclosed herein provide a relatively simple way in which the transition SNR can be estimated in closed-form. For example, the case in which H is dominated by two clusters (other clusters have weaker power and can be assumed to not contribute much to channel matrix) may be considered. This scenario captures many practical mmW deployments such a dominant line of sight (LOS) and a dominant non line of sight (NLOS) path. For example, this scenario may include an indoor hotspot with a LOS path and a NLOS reflection.

In this scenario, the channel matrix H may be characterized as:

$$H \approx \alpha_1 \cdot u_1 v_1^H + \alpha_2 \cdot u_2 v_2^H,$$

where $\alpha_1$ is the complex gain of the dominant cluster, $u_1$ is the dominant array steering vector at Rx, $v_1$ is the dominant array steering vector at Tx, $\alpha_2$ is the complex gain of the sub-dominant cluster, $u_2$ is the sub-dominant array steering vector at Rx, and $v_2$ is the sub-dominant array steering vector at Tx.

If the following inner products of array steering vectors are denoted in this manner:

$$u_1^H u_2 = e^{j\theta} \cdot \cos(\phi) \text{ and } v_1^H v_2 = e^{j\mu} \cdot \cos(\gamma),$$

then, application of linear algebra may show that switching from rank-1 to rank-2 spatial MIMO is optimal if $$\rho \leq \frac{[|\alpha_1|^2 + |\alpha_2|^2 + \cos(\phi)\cos(\gamma) \cdot (\alpha_1 \alpha_2^* e^{j\mu - j\theta} + \alpha_1^* \alpha_2 e^{j\mu - j\theta})]^2 + 4|\alpha_1|^2|\alpha_2|^2 \cos^2(\phi)\cos^2(\gamma)}{|\alpha_1|^2|\alpha_2|^2(1 - \cos^2(\phi)) \cdot (1 - \cos^2(\gamma))} - 4$$

$$= \frac{([|\alpha_1|^2 + |\alpha_2|^2 + 2\cos((\phi)\cos(\gamma) \cdot |\alpha_1||\alpha_2| \cos(\mu - \theta + \angle\alpha_1 - \angle\alpha_2)]^2 + 4|\alpha_1|^2|\alpha_2|^2\cos^2((\phi)\cos^2(\gamma))}{(|\alpha_1|^2|\alpha_2|^2(1 - \cos^2((\phi)) \cdot (1 - \cos^2(\gamma)))} - 4.$$

This expression is given in terms of channel parameters but may still be too cumbersome to be evaluated in practice.

To approximate the threshold for the SNR, some aspects may include a two stage approximation scheme. In a first approximation, since $\alpha_1$ and $\alpha_2$ capture the complex gains of the dominant and sub-dominant clusters, the wireless communication device may approximate $|\alpha_1|^2$ by the RSRP of the best beam pair and $|\alpha_2|^2$ by the RSRP of the second best beam pair (in the beam training process used over synchronization signal blocks (SSBs) in initial acquisition). In the second approximation, $\varphi$ and $\gamma$ denote the angle/direction between the best and second best beams at both sides of the communication, whereas $\theta$ and $\mu$ denote the phase in the complex correlation between the best and second best beams at both sides of the communication. Computing $\varphi$, $\gamma$, $\theta$ and $\mu$ requires knowledge of the best and second best beams at both sides, which also supposes knowledge of the beamforming codebooks used at both sides, however, each device is unaware of the other device's codebook. On the other hand, one of the devices can compute the corresponding angle/direction and phase of the complex correlation coefficient and feed it back to the other device, allowing that device to make an estimate of the threshold to the SNR.

As described above, in some aspects, a first wireless communication device receives reference signals from a second wireless communication device and feeds back a complex correlation coefficient between the best beam and second best beam as seen from the perspective of the first wireless communication device. Based on the second wireless communication device's knowledge of RSRPs of best and second best beams, as well as the complex correlation of the best and second best beam from the perspective of the second wireless communication device ($\mu$ and $\gamma$) which it is aware of based on the feedback of the best beam indices to be used at the second device. Transmission Configuration Indicator (TCI) state feedback, the second wireless communication device may compute the transition SNR and may indicate a switch from rank-2 transmissions to rank-4 transmissions (or vice versa).

As indicated above, FIG. 4 is provided as an example. Other examples may differ from what is described with regard to FIG. 4.

Figure 5:
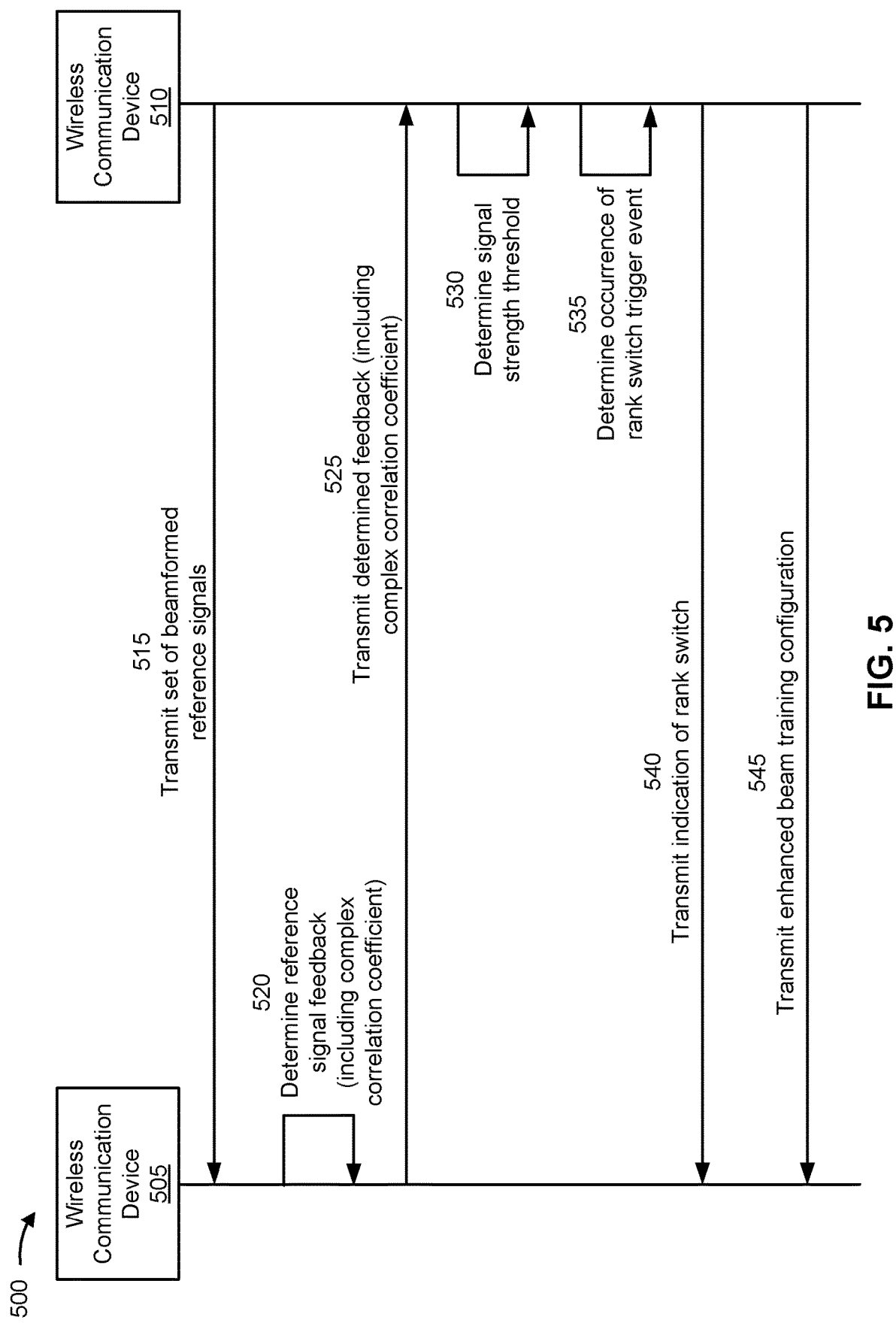
FIG. 5 is a diagram illustrating an example associated with switching between rank two and rank four operating modes for analog beamforming, in accordance with the present disclosure.

FIG. 5 is a diagram illustrating an example 500 associated with switching between rank two and rank four operating modes for analog beamforming, in accordance with the present disclosure. As shown, a wireless communication device 505 and a wireless communication device 510 may communicate with one another. In some aspects, the wireless communication device 505 and/or the wireless communication device 510 may be, or include, a UE, a CPE, a base station, a relay node, an IAB node, or a repeater node with configurable beamforming capabilities.

As shown by reference number 515, the wireless communication device 510 may transmit, and the wireless communication device 505 may receive, a set of beamformed reference signals for analog beam training. As shown by reference number 520, the wireless communication device 505 may determine reference signal feedback based at least in part on the set of beamformed reference signals. For example, in some aspects, the wireless communication device 505 may determine a first signal strength associated with a first beam pair and a second signal strength associated with a second beam pair. The first beam pair may include a beam associated with the wireless communication device 505 and a beam associated with the wireless communication device 510 that correspond to a first beamformed reference signal. The second beam pair may include a beam associated with the wireless communication device 505 and a beam associated with the wireless communication device 510 that correspond to a second beamformed reference signal. In some aspects, the wireless communication device 505 may determine any number of signal strengths associated with any number of beam pairs and may identify two beam pairs for reporting.

The two beam pairs may include a best beam pair and a second best beam pair. A best beam pair may be a beam pair associated with a signal strength that is greater than a signal strength associated with any other evaluated beam pair. A second best beam pair may be a beam pair associated with a signal strength that is greater than a signal strength of any other beam pair except the best beam pair. In some aspects, the signal strength may include an RSRP, an RSRQ, an RSSI, a signal to interference plus noise ratio (SINR), and/or an SNR, among other examples. In some aspects, the wireless communication device 510 also may determine a third signal strength associated with the first beam pair and a fourth signal strength associated with the second beam pair.

In some aspects, the wireless communication device 505 may determine a first complex correlation coefficient. The complex correlation coefficient may be associated with the wireless communication device 505 and may be based at least in part on the set of beamformed reference signals. The complex correlation coefficient may represent a phase between a first beamforming vector used for beamforming at the wireless communication device 505 based at least in part on a first beamformed reference signal of the set of beamformed reference signals and a second beamforming vector used for beamforming at the wireless communication device 505 based at least in part on a second beamformed reference signal of the set of beamformed reference signals. The complex correlation coefficient may also represent an angle between the first beamforming vector and the second beamforming vector and may be determined as described above in connection with FIG. 4.

In some aspects, the wireless communication device 510 may determine a second complex correlation coefficient. The second complex correlation coefficient may be associated with the wireless communication device 510 and may be based at least in part on the set of beamformed reference signals. The second complex correlation coefficient may represent a phase between a first beamforming vector used for beamforming at the wireless communication device 510 based at least in part on a first beamformed reference signal of the set of beamformed reference signals and a second beamforming vector used for beamforming at the wireless communication device 510 based at least in part on a second beamformed reference signal of the set of beamformed reference signals. The second complex correlation coefficient may also represent an angle between the first beamforming vector and the second beamforming vector and may be determined as described above in connection with FIG. 4.

As shown by reference number 525, the wireless communication device 505 may transmit, and the wireless communication device 510 may receive, the determined feedback. The feedback may indicate the first complex correlation coefficient. The feedback may further indicate the first signal strength associated with the first beam pair and the second signal strength associated with the second beam pair. In some aspects, the feedback may further indicate beam information associated with the first beam pair and the second beam pair. The beam information may include, for example, one or more transmission configuration indicators (TCIs), one or more PMIs, one or more beam directions, one or more beam phases, and/or codebook information, among other examples.

As shown by reference number 530, the wireless communication device 510 may determine a signal strength threshold for determining an occurrence of a rank switch trigger event. In some aspects, the wireless communication device 510 may determine the signal strength threshold based at least in part on the first complex correlation coefficient, the second complex correlation coefficient, the first signal strength, the second signal strength, and/or the beam information, among other examples.

As shown by reference number 535, the wireless communication device 510 may determine an occurrence of a rank switch trigger event based at least in part on determining that an operating signal strength satisfies the signal strength threshold. In some aspects, the signal strength threshold may include, or be referred to as, a transition SNR. The wireless communication device 510 may switch from a rank two operating mode to a rank four operating mode, or vice versa, based on determining the occurrence of the rank switch trigger event. In some aspects, the rank switch may be further based at least in part on a determination that an operating signal strength satisfies the signal strength threshold. In some aspects, the rank switch may be based at least in part on at least one codebook indicated by a wireless communication standard.

As shown by reference number 540, the wireless communication device 510 may transmit, and the wireless communication device 505 may receive, an indication of a rank switch from a first rank operating mode to a second rank operating mode. The first rank operating mode may correspond to rank two transmissions and the second rank operating mode may correspond to rank four transmissions, or the first rank operating mode may correspond to rank four transmissions and the second rank operating mode may correspond to rank two transmissions. In some aspects, the rank two transmissions may correspond to transmissions over two polarizations with a single beam, and rank four transmissions may As shown by reference number 545, the wireless communication device 510 may transmit, and the wireless communication device 505 may receive an enhanced beam training configuration. The enhanced beam training configuration may indicate an additional set of beamformed reference signals for beam training associated with the second rank operating mode. In some aspects, the wireless communication device 510 may determine a realizable data rate associated with the second rank operating mode. The wireless communication device 510 may schedule the wireless communication device 505 and one or more additional wireless communication devices based at least in part on the realizable data rate.

As indicated above, FIG. 5 is provided as an example. Other examples may differ from what is described with regard to FIG. 5.

Figure 6:
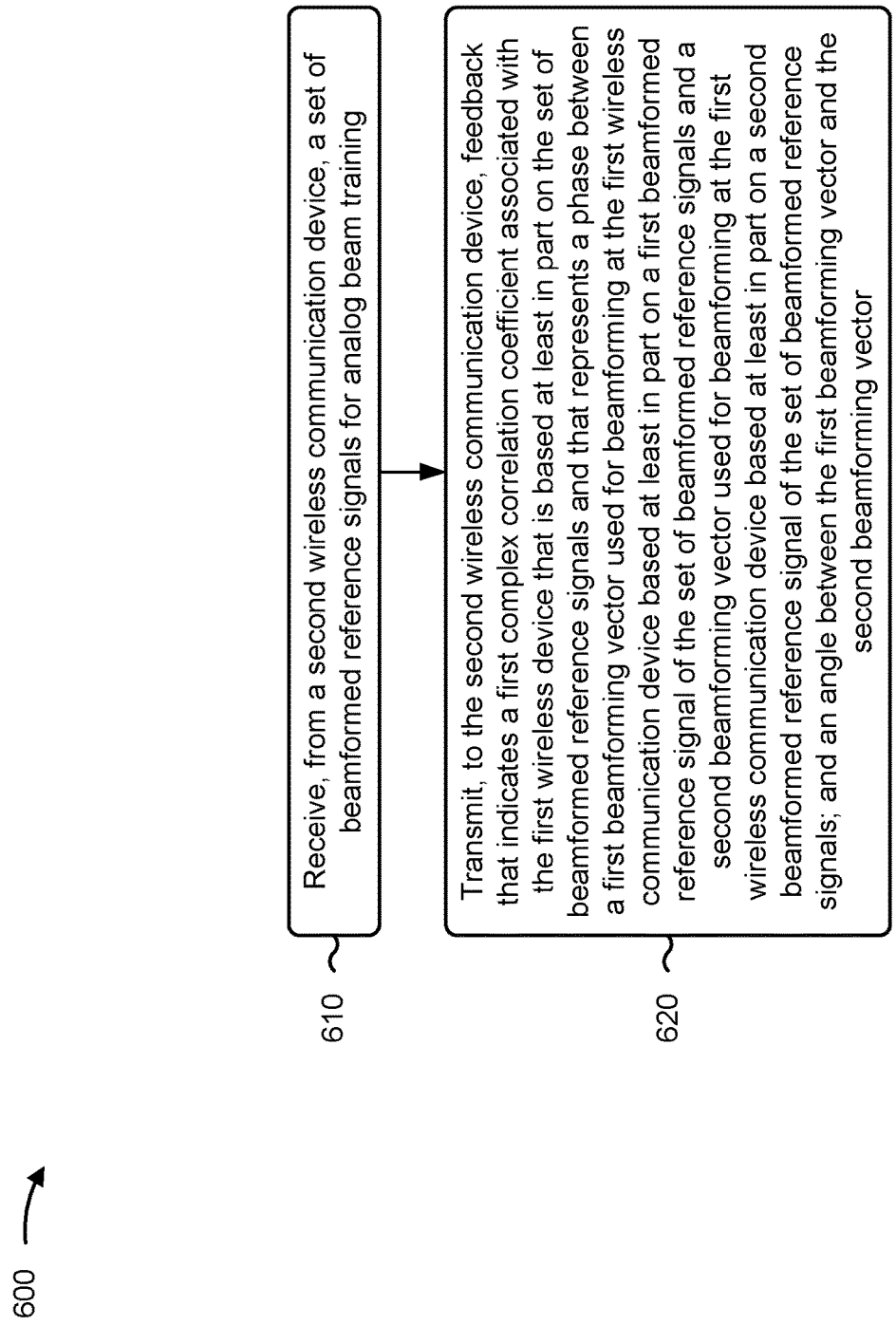
FIGS. 6 and 7 are diagrams illustrating example processes associated with switching between rank two and rank four operating modes for analog beamforming, in accordance with the present disclosure.

FIG. 6 is a diagram illustrating an example process 600 performed, for example, by a first wireless communication device, in accordance with the present disclosure. Example process 600 is an example where the first wireless communication device (e.g., wireless communication device 505) performs operations associated with switching between rank two and rank four operating modes for analog beamforming.

As shown in FIG. 6, in some aspects, process 600 may include receiving, from a second wireless communication device, a set of beamformed reference signals for analog beam training (block 610). For example, the first wireless communication device (e.g., using reception component 802, depicted in FIG. 8) may receive, from a second wireless communication device, a set of beamformed reference signals for analog beam training, as described above.

As further shown in FIG. 6, in some aspects, process 600 may include transmitting, to the second wireless communication device, feedback that indicates a first complex correlation coefficient associated with the first wireless communication device that is based at least in part on the set of beamformed reference signals and that represents: a phase between a first beamforming vector used for beamforming at the first wireless communication device based at least in part on a first beamformed reference signal of the set of beamformed reference signals and a second beamforming vector used for beamforming at the first wireless communication device based at least in part on a second beamformed reference signal of the set of beamformed reference signals; and an angle between the first beamforming vector and the second beamforming vector (block 620). For example, the first wireless communication device (e.g., using transmission component 804, depicted in FIG. 8) may transmit, to the second wireless communication device, feedback that indicates a first complex correlation coefficient associated with the first wireless communication device that is based at least in part on the set of beamformed reference signals and that represents: a phase between a first beamforming vector used for beamforming at the first wireless communication device based at least in part on a first beamformed reference signal of the set of beamformed reference signals and a second beamforming vector used for beamforming at the first wireless communication device based at least in part on a second beamformed reference signal of the set of beamformed reference signals; and an angle between the first beamforming vector and the second beamforming vector, as described above.

Process 600 may include additional aspects, such as any single aspect or any combination of aspects described below and/or in connection with one or more other processes described elsewhere herein.

In a first aspect, the feedback further indicates a first signal strength associated with a first beam pair and a second signal strength associated with a second beam pair, wherein the feedback further indicates beam information associated with the first beam pair and the second beam pair.

In a second aspect, alone or in combination with the first aspect, process 600 includes receiving, from the second wireless communication device, an indication of a rank switch from a first rank operating mode to a second rank operating mode, wherein the rank switch is based at least in part on a signal strength threshold, wherein the signal strength threshold is based at least in part on the first complex correlation coefficient, a second complex correlation coefficient associated with the second device, the first signal strength, the second signal strength, and the beam information.

In a third aspect, alone or in combination with the second aspect, the first rank operating mode corresponds to rank two transmissions and the second rank operating mode corresponds to rank four transmissions, or the first rank operating mode corresponds to rank four transmissions and the second rank operating mode corresponds to rank two transmissions.

In a fourth aspect, alone or in combination with the third aspect, the rank switch is further based at least in part on a determination that an operating signal strength satisfies the signal strength threshold.

In a fifth aspect, alone or in combination with one or more of the third through fourth aspects, the signal strength threshold comprises a transition signal-to-noise ratio.

In a sixth aspect, alone or in combination with one or more of the third through fifth aspects, process 600 includes receiving, from the second wireless communication device, an enhanced beam training configuration that indicates an additional set of beamformed reference signals for beam training associated with the second rank operating mode.

In a seventh aspect, alone or in combination with one or more of the third through sixth aspects, the rank switch is based at least in part on at least one codebook indicated by a wireless communication standard.

In an eighth aspect, alone or in combination with one or more of the first through seventh aspects, the first wireless communication device comprises a UE, a CPE, a base station, a relay node, an IAB node, or a repeater node with configurable beamforming capabilities.

In a ninth aspect, alone or in combination with one or more of the first through eighth aspects, the second wireless communication device comprises a UE, a CPE, a base station, a relay node, an IAB node, or a repeater node with configurable beamforming capabilities.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
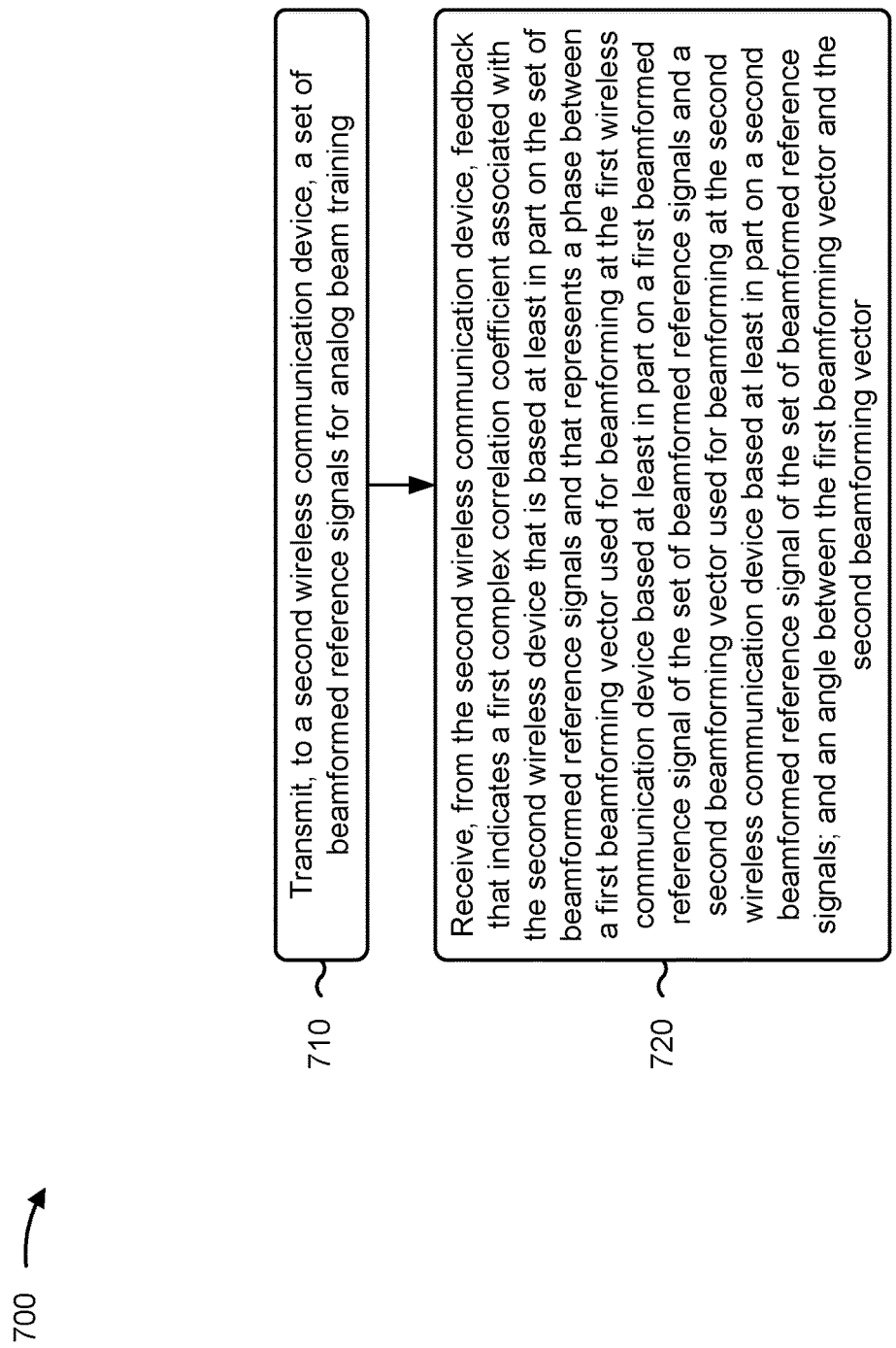

FIG. 7 is a diagram illustrating an example process 700 performed, for example, by a first wireless communication device, in accordance with the present disclosure. Example process 700 is an example where the first wireless communication device (e.g., wireless communication device 510) performs operations associated with switching between rank two and rank four operating modes for analog beamforming.

As shown in FIG. 7, in some aspects, process 700 may include transmitting, to a second wireless communication device, a set of beamformed reference signals for analog beam training (block 710). For example, the first wireless communication device (e.g., using transmission component 804, depicted in FIG. 8) may transmit, to a second wireless communication device, a set of beamformed reference signals for analog beam training, as described above.

As further shown in FIG. 7, in some aspects, process 700 may include receiving, from the second wireless communication device, feedback that indicates a first complex correlation coefficient associated with the second wireless communication device that is based at least in part on the set of beamformed reference signals and that represents: a phase between a first beamforming vector used for beamforming at the first wireless communication device based at least in part on a first beamformed reference signal of the set of beamformed reference signals and a second beamforming vector used for beamforming at the second wireless communication device based at least in part on a second beamformed reference signal of the set of beamformed reference signals; and an angle between the first beamforming vector and the second beamforming vector (block 720). For example, the first wireless communication device (e.g., using reception component 802, depicted in FIG. 8) may receive, from the second wireless communication device, feedback that indicates a first complex correlation coefficient associated with the second wireless communication device that is based at least in part on the set of beamformed reference signals and that represents: a phase between a first beamforming vector used for beamforming at the first wireless communication device based at least in part on a first beamformed reference signal of the set of beamformed reference signals and a second beamforming vector used for beamforming at the second wireless communication device based at least in part on a second beamformed reference signal of the set of beamformed reference signals; and an angle between the first beamforming vector and the second beamforming vector, as described above.

Process 700 may include additional aspects, such as any single aspect or any combination of aspects described below and/or in connection with one or more other processes described elsewhere herein.

In a first aspect, the feedback further indicates a first signal strength associated with a first beam pair and a second signal strength associated with a second beam pair, wherein the feedback further indicates beam information associated with the first beam pair and the second beam pair.

In a second aspect, alone or in combination with the first aspect, process 700 includes determining a signal strength threshold based at least in part on the first complex correlation coefficient, a second complex correlation coefficient associated with the second device, the first signal strength, the second signal strength, and the beam information.

In a third aspect, alone or in combination with the second aspect, process 700 includes determining an occurrence of a rank switch trigger event based at least in part on determining that an operating signal strength satisfies the signal strength threshold.

In a fourth aspect, alone or in combination with the third aspect, the signal strength threshold comprises a transition signal-to-noise ratio.

In a fifth aspect, alone or in combination with one or more of the third through fourth aspects, process 700 includes transmitting, to the second wireless communication device, an indication of a rank switch from a first rank operating mode to a second rank operating mode, wherein the rank switch is based at least in part on determining the occurrence of the rank switch trigger event.

In a sixth aspect, alone or in combination with fifth aspect, the first rank operating mode corresponds to rank two transmissions and the second rank operating mode corresponds to rank four transmissions, or the first rank operating mode corresponds to rank four transmissions and the second rank operating mode corresponds to rank two transmissions.

In a seventh aspect, alone or in combination with one or more of the fifth through sixth aspects, process 700 includes transmitting, to the second wireless communication device, an enhanced beam training configuration that indicates an additional set of beamformed reference signals for beam training associated with the second rank operating mode.

In an eighth aspect, alone or in combination with one or more of the fifth through seventh aspects, process 700 includes determining a realizable data rate associated with the second rank operating mode, and scheduling the second wireless communication device and at least a third wireless communication device based at least in part on the realizable data rate.

In a ninth aspect, alone or in combination with one or more of the third through eighth aspects, determining the occurrence of the rank switch triggering event comprises determining the occurrence of the rank switch triggering event based at least in part on at least one codebook indicated by a wireless communication standard.

In a tenth aspect, alone or in combination with one or more of the first through ninth aspects, the first wireless communication device comprises a UE, a CPE, a base station, a relay node, an IAB node, or a repeater node with configurable beamforming capabilities.

In an eleventh aspect, alone or in combination with one or more of the first through tenth aspects, the second wireless communication device comprises a UE, a CPE, a base station, a relay node, an IAB node, or a repeater node with configurable beamforming capabilities.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
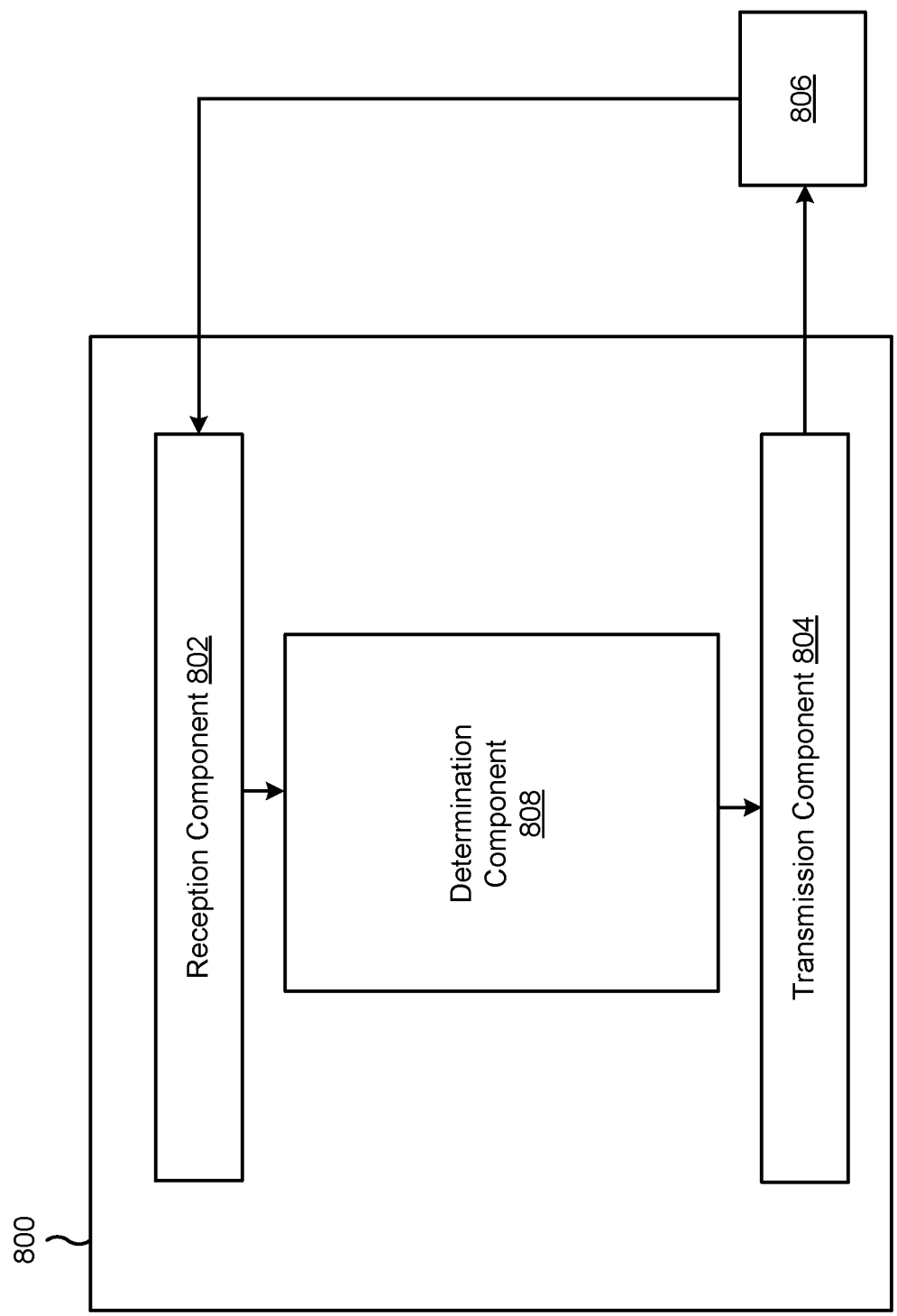
FIG. 8 is a block diagram of an example apparatus for wireless communication, in accordance with the present disclosure.

FIG. 8 is a block diagram of an example apparatus 800 for wireless communication. The apparatus 800 may be a wireless communication device, or a wireless communication device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE and/or the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the wireless communication device described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the wireless communication device described above in connection with FIG. 2. In some aspects, the transmission component 804 may be co-located with the reception component 802 in a transceiver.

The reception component 802 may receive, from a second wireless communication device, a set of beamformed reference signals for analog beam training. The determination component 808 may determine a first complex correlation coefficient associated with the first wireless communication device that is based at least in part on the set of beamformed reference signals and that represents a phase between a first beamforming vector used for beamforming at the first wireless communication device based at least in part on a first beamformed reference signal of the set of beamformed reference signals and a second beamforming vector used for beamforming at the first wireless communication device based at least in part on a second beamformed reference signal of the set of beamformed reference signals; and an angle between the first beamforming vector and the second beamforming vector. In some aspects, the determination component 808 may include one or more antennas, a modulator, a transmit MIMO processor, a transmit processor, a controller/processor, a memory, or a combination thereof, of the wireless communication device described above in connection with FIG. 2. In some aspects, the determination component 808 may include the reception component 802 and/or the transmission component 804.

The transmission component 804 may transmit, to the second wireless communication device, feedback that indicates the first complex correlation coefficient. The reception component 802 may receive, from the second wireless communication device, an indication of a rank switch from a first rank operating mode to a second rank operating mode, wherein the rank switch is based at least in part on a signal strength threshold, wherein the signal strength threshold is based at least in part on the first complex correlation coefficient, a second complex correlation coefficient associated with the second device, the first signal strength, the second signal strength, and the beam information.

The reception component 802 may receive, from the second wireless communication device, an enhanced beam training configuration that indicates an additional set of beamformed reference signals for beam training associated with the second rank operating mode.

The transmission component 804 may transmit, to a second wireless communication device, a set of beamformed reference signals for analog beam training. The reception component 802 may receive, from the second wireless communication device, feedback that indicates a first complex correlation coefficient associated with the second wireless communication device that is based at least in part on the set of beamformed reference signals and that represents a phase between a first beamforming vector used for beamforming at the second wireless communication device based at least in part on a first beamformed reference signal of the set of beamformed reference signals and a second beamforming vector used for beamforming at the second wireless communication device based at least in part on a second beamformed reference signal of the set of beamformed reference signals; and an angle between the first beamforming vector and the second beamforming vector.

The determination component 808 may determine a signal strength threshold based at least in part on the first complex correlation coefficient, a second complex correlation coefficient associated with the second device, the first signal strength, the second signal strength, and the beam information. The determination component 808 may determine an occurrence of a rank switch trigger event based at least in part on determining that an operating signal strength satisfies the signal strength threshold.

The transmission component 804 may transmit, to the second wireless communication device, an indication of a rank switch from a first rank operating mode to a second rank operating mode, wherein the rank switch is based at least in part on determining the occurrence of the rank switch trigger event. The transmission component 804 may transmit, to the second wireless communication device, an enhanced beam training configuration that indicates an additional set of beamformed reference signals for beam training associated with the second rank operating mode.

The determination component 808 may determine a realizable data rate associated with the second rank operating mode. The determination component 808 may schedule the second wireless communication device and at least a third wireless communication device based at least in part on the realizable data rate.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a first wireless communication device, comprising: receiving, from a second wireless communication device, a set of beamformed reference signals for analog beam training; and transmitting, to the second wireless communication device, feedback that indicates a first complex correlation coefficient associated with the first wireless communication device that is based at least in part on the set of beamformed reference signals and that represents: a phase between a first beamforming vector used for beamforming at the first wireless communication device based at least in part on a first beamformed reference signal of the set of beamformed reference signals and a second beamforming vector used for beamforming at the first wireless communication device based at least in part on a second beamformed reference signal of the set of beamformed reference signals; and an angle between the first beamforming vector and the second beamforming vector.

Aspect 2: The method of Aspect 1, wherein the feedback further indicates a first signal strength associated with a first beam pair and a second signal strength associated with a second beam pair, wherein the feedback further indicates beam information associated with the first beam pair and the second beam pair.

Aspect 3: The method of Aspect 2, further comprising receiving, from the second wireless communication device, an indication of a rank switch from a first rank operating mode to a second rank operating mode, wherein the rank switch is based at least in part on a signal strength threshold, wherein the signal strength threshold is based at least in part on the first complex correlation coefficient, a second complex correlation coefficient associated with the second device, the first signal strength, the second signal strength, and the beam information.

Aspect 4: The method of Aspect 3, wherein the first rank operating mode corresponds to rank two transmissions and the second rank operating mode corresponds to rank four transmissions, or the first rank operating mode corresponds to rank four transmissions and the second rank operating mode corresponds to rank two transmissions.

Aspect 5: The method of Aspect 4, wherein the rank switch is further based at least in part on a determination that an operating signal strength satisfies the signal strength threshold.

Aspect 6: The method of either of Aspects 4 or 5, wherein the signal strength threshold comprises a transition signal-to-noise ratio.

Aspect 7: The method of any of Aspects 4-6, further comprising receiving, from the second wireless communication device, an enhanced beam training configuration that indicates an additional set of beamformed reference signals for beam training associated with the second rank operating mode.

Aspect 8: The method of any of Aspects 4-7, wherein the rank switch is based at least in part on at least one codebook indicated by a wireless communication standard.

Aspect 9: The method of any of Aspects 1-8, wherein the first wireless communication device comprises a user equipment, a customer premises equipment, a base station, a relay node, an integrated access and backhaul node, or a repeater node with configurable beamforming capabilities.

Aspect 10: The method of any of Aspects 1-9, wherein the second wireless communication device comprises a user equipment, a customer premises equipment, a base station, a relay node, an integrated access and backhaul node, or a repeater node with configurable beamforming capabilities.

Aspect 11: A method of wireless communication performed by a first wireless communication device, comprising: transmitting, to a second wireless communication device, a set of beamformed reference signals for analog beam training; and receiving, from the second wireless communication device, feedback that indicates a first complex correlation coefficient associated with the second wireless communication device that is based at least in part on the set of beamformed reference signals and that represents: a phase between a first beamforming vector used for beamforming at the second wireless communication device based at least in part on a first beamformed reference signal of the set of beamformed reference signals and a second beamforming vector used for beamforming at the second wireless communication device based at least in part on a second beamformed reference signal of the set of beamformed reference signals; and an angle between the first beamforming vector and the second beamforming vector.

Aspect 12: The method of Aspect 11, wherein the feedback further indicates a first signal strength associated with a first beam pair and a second signal strength associated with a second beam pair, wherein the feedback further indicates beam information associated with the first beam pair and the second beam pair.

Aspect 13: The method of Aspect 12, further comprising determining a signal strength threshold based at least in part on the first complex correlation coefficient, a second complex correlation coefficient associated with the second device, the first signal strength, the second signal strength, and the beam information.

Aspect 14: The method of Aspect 13, further comprising determining an occurrence of a rank switch trigger event based at least in part on determining that an operating signal strength satisfies the signal strength threshold.

Aspect 15: The method of Aspect 14, wherein the signal strength threshold comprises a transition signal-to-noise ratio.

Aspect 16: The method of either of Aspects 14 or 15, further comprising transmitting, to the second wireless communication device, an indication of a rank switch from a first rank operating mode to a second rank operating mode, wherein the rank switch is based at least in part on determining the occurrence of the rank switch trigger event.

Aspect 17: The method of Aspect 16, wherein the first rank operating mode corresponds to rank two transmissions and the second rank operating mode corresponds to rank four transmissions, or the first rank operating mode corresponds to rank four transmissions and the second rank operating mode corresponds to rank two transmissions.

Aspect 18: The method of either of Aspects 16 or 17, further comprising transmitting, to the second wireless communication device, an enhanced beam training configuration that indicates an additional set of beamformed reference signals for beam training associated with the second rank operating mode.

Aspect 19: The method of any of Aspects 16-18, further comprising: determining a realizable data rate associated with the second rank operating mode; and scheduling the second wireless communication device and at least a third wireless communication device based at least in part on the realizable data rate.

Aspect 20: The method of any of Aspects 14-19, wherein determining the occurrence of the rank switch triggering event comprises determining the occurrence of the rank switch triggering event based at least in part on at least one codebook indicated by a wireless communication standard.

Aspect 21: The method of any of Aspects 11-20, wherein the first wireless communication device comprises a user equipment, a customer premises equipment, a base station, a relay node, an integrated access and backhaul node, or a repeater node with configurable beamforming capabilities.

Aspect 22: The method of any of Aspects 11-21, wherein the second wireless communication device comprises a user equipment, a customer premises equipment, a base station, a relay node, an integrated access and backhaul node, or a repeater node with configurable beamforming capabilities.

Aspect 23: An apparatus for wireless communication at a device, comprising a processor; memory coupled with the processor; and instructions stored in the memory and executable by the processor to cause the apparatus to perform the method of one or more Aspects of Aspects 1-10.

Aspect 24: A device for wireless communication, comprising a memory and one or more processors coupled to the memory, the memory and the one or more processors configured to perform the method of one or more Aspects of Aspects 1-10.

Aspect 25: An apparatus for wireless communication, comprising at least one means for performing the method of one or more Aspects of Aspects 1-10.

Aspect 26: A non-transitory computer-readable medium storing code for wireless communication, the code comprising instructions executable by a processor to perform the method of one or more Aspects of Aspects 1-10.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 1-10.

Aspect 28: An apparatus for wireless communication at a device, comprising a processor; memory coupled with the processor; and instructions stored in the memory and executable by the processor to cause the apparatus to perform the method of one or more Aspects of Aspects 11-22.

Aspect 29: A device for wireless communication, comprising a memory and one or more processors coupled to the memory, the memory and the one or more processors configured to perform the method of one or more Aspects of Aspects 11-22.

Aspect 30: An apparatus for wireless communication, comprising at least one means for performing the method of one or more Aspects of Aspects 11-22.

Aspect 31: A non-transitory computer-readable medium storing code for wireless communication, the code comprising instructions executable by a processor to perform the method of one or more Aspects of Aspects 11-22.

Aspect 32: A non-transitory computer-readable medium storing a set of instructions for wireless communication, the set of instructions comprising one or more instructions that, when executed by one or more processors of a device, cause the device to perform the method of one or more Aspects of Aspects 11-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device for wireless communication, comprising:
    a memory; and
    one or more processors coupled to the memory, the memory and the one or more processors configured to:
        receive, from a second wireless communication device, a set of beamformed reference signals for analog beam training; and
        transmit, to the second wireless communication device, feedback that indicates a first complex correlation coefficient associated with the first wireless communication device that is based at least in part on the set of beamformed reference signals and that represents:
            a phase between a first beamforming vector used for beamforming at the first wireless communication device based at least in part on a first beamformed reference signal of the set of beamformed reference signals and a second beamforming vector used for beamforming at the first wireless communication device based at least in part on a second beamformed reference signal of the set of beamformed reference signals; and
            an angle between the first beamforming vector and the second beamforming vector.

2. The first wireless communication device of claim 1, wherein the feedback further indicates a first signal strength associated with a first beam pair and a second signal strength associated with a second beam pair, wherein the feedback further indicates beam information associated with the first beam pair and the second beam pair.

3. The first wireless communication device of claim 2, wherein the memory and the one or more processors are further configured to receive, from the second wireless communication device, an indication of a rank switch from a first rank operating mode to a second rank operating mode, wherein the rank switch is based at least in part on a signal strength threshold, wherein the signal strength threshold is based at least in part on the first complex correlation coefficient, a second complex correlation coefficient associated with the second device, the first signal strength, the second signal strength, and the beam information.

4. The first wireless communication device of claim 3, wherein the first rank operating mode corresponds to rank two transmissions and the second rank operating mode corresponds to rank four transmissions, or the first rank operating mode corresponds to rank four transmissions and the second rank operating mode corresponds to rank two transmissions.

5. The first wireless communication device of claim 4, wherein the rank switch is further based at least in part on a determination that an operating signal strength satisfies the signal strength threshold.

6. The first wireless communication device of claim 4, wherein the signal strength threshold comprises a transition signal-to-noise ratio.

7. The first wireless communication device of claim 4, wherein the memory and the one or more processors are further configured to receive, from the second wireless communication device, an enhanced beam training configuration that indicates an additional set of beamformed reference signals for beam training associated with the second rank operating mode.

8. The first wireless communication device of claim 4, wherein the rank switch is based at least in part on at least one codebook indicated by a wireless communication standard.

9. The first wireless communication device of claim 1, wherein the first wireless communication device comprises a user equipment, a customer premises equipment, a base station, a relay node, an integrated access and backhaul node, or a repeater node with configurable beamforming capabilities.

10. The first wireless communication device of claim 1, wherein the second wireless communication device comprises a user equipment, a customer premises equipment, a base station, a relay node, an integrated access and backhaul node, or a repeater node with configurable beamforming capabilities.

11. A first wireless communication device for wireless communication, comprising:
    a memory; and
    one or more processors coupled to the memory, the memory and the one or more processors configured to:
        transmit, to a second wireless communication device, a set of beamformed reference signals for analog beam training; and
        receive, from the second wireless communication device, feedback that indicates a first complex correlation coefficient associated with the second wireless communication device that is based at least in part on the set of beamformed reference signals and that represents:
            a phase between a first beamforming vector used for beamforming at the second wireless communication device based at least in part on a first beamformed reference signal of the set of beamformed reference signals and a second beamforming vector used for beamforming at the second wireless communication device based at least in part on a second beamformed reference signal of the set of beamformed reference signals; and
an angle between the first beamforming vector and the second beamforming vector.

12. The first wireless communication device of claim 11, wherein the feedback further indicates a first signal strength associated with a first beam pair and a second signal strength associated with a second beam pair, wherein the feedback further indicates beam information associated with the first beam pair and the second beam pair.

13. The first wireless communication device of claim 12, wherein the memory and the one or more processors are further configured to determine a signal strength threshold based at least in part on the first complex correlation coefficient, a second complex correlation coefficient associated with the second device, the first signal strength, the second signal strength, and the beam information.

14. The first wireless communication device of claim 13, wherein the memory and the one or more processors are further configured to determine an occurrence of a rank switch trigger event based at least in part on determining that an operating signal strength satisfies the signal strength threshold.

15. The first wireless communication device of claim 14, wherein the signal strength threshold comprises a transition signal-to-noise ratio.

16. The first wireless communication device of claim 14, wherein the memory and the one or more processors are further configured to transmit, to the second wireless communication device, an indication of a rank switch from a first rank operating mode to a second rank operating mode, wherein the rank switch is based at least in part on determining the occurrence of the rank switch trigger event.

17. The first wireless communication device of claim 16, wherein the first rank operating mode corresponds to rank two transmissions and the second rank operating mode corresponds to rank four transmissions, or the first rank operating mode corresponds to rank four transmissions and the second rank operating mode corresponds to rank two transmissions.

18. The first wireless communication device of claim 16, wherein the memory and the one or more processors are further configured to transmit, to the second wireless communication device, an enhanced beam training configuration that indicates an additional set of beamformed reference signals for beam training associated with the second rank operating mode.

19. The first wireless communication device of claim 16, wherein the memory and the one or more processors are further configured to:
determine a realizable data rate associated with the second rank operating mode; and
schedule the second wireless communication device and at least a third wireless communication device based at least in part on the realizable data rate.

20. The first wireless communication device of claim 14, wherein the memory and the one or more processors, when determining the occurrence of the rank switch triggering event, are configured to determine the occurrence of the rank switch triggering event based at least in part on at least one codebook indicated by a wireless communication standard.

21. The first wireless communication device of claim 11, wherein the first wireless communication device comprises a user equipment, a customer premises equipment, a base station, a relay node, an integrated access and backhaul node, or a repeater node with configurable beamforming capabilities.

22. The first wireless communication device of claim 11, wherein the second wireless communication device comprises a user equipment, a customer premises equipment, a base station, a relay node, an integrated access and backhaul node, or a repeater node with configurable beamforming capabilities.

23. A method of wireless communication performed by a first wireless communication device, comprising:
receiving, from a second wireless communication device, a set of beamformed reference signals for analog beam training; and
transmitting, to the second wireless communication device, feedback that indicates a first complex correlation coefficient associated with the first wireless communication device that is based at least in part on the set of beamformed reference signals and that represents:
a phase between a first beamforming vector used for beamforming at the first wireless communication device based at least in part on a first beamformed reference signal of the set of beamformed reference signals and a second beamforming vector used for beamforming at the first wireless communication device based at least in part on a second beamformed reference signal of the set of beamformed reference signals; and
an angle between the first beamforming vector and the second beamforming vector.

24. The method of claim 23, wherein the feedback further indicates a first signal strength associated with a first beam pair and a second signal strength associated with a second beam pair, wherein the feedback further indicates beam information associated with the first beam pair and the second beam pair.

25. The method of claim 24, further comprising receiving, from the second wireless communication device, an indication of a rank switch from a first rank operating mode to a second rank operating mode, wherein the rank switch is based at least in part on a signal strength threshold, wherein the signal strength threshold is based at least in part on the first complex correlation coefficient, a second complex correlation coefficient associated with the second device, the first signal strength, the second signal strength, and the beam information.

26. The method of claim 25, wherein the first rank operating mode corresponds to rank two transmissions and the second rank operating mode corresponds to rank four transmissions, or the first rank operating mode corresponds to rank four transmissions and the second rank operating mode corresponds to rank two transmissions.

27. The method of claim 26, wherein the rank switch is further based at least in part on a determination that an operating signal strength satisfies the signal strength threshold.

28. The method of claim 26, wherein the signal strength threshold comprises a transition signal-to-noise ratio.

29. The method of claim 26, further comprising:
receiving, from the second wireless communication device, an enhanced beam training configuration that indicates an additional set of beamformed reference signals for beam training associated with the second rank operating mode.

30. The method of claim 26, wherein the rank switch is based at least in part on at least one codebook indicated by a wireless communication standard.

31. The method of claim 23, wherein the first wireless communication device comprises a user equipment, a customer premises equipment, a base station, a relay node, an integrated access and backhaul node, or a repeater node with configurable beamforming capabilities.

32. The method of claim 23, wherein the second wireless communication device comprises a user equipment, a customer premises equipment, a base station, a relay node, an integrated access and backhaul node, or a repeater node with configurable beamforming capabilities.

33. A method of wireless communication performed by a first wireless communication device, comprising:
 transmitting, to a second wireless communication device, a set of beamformed reference signals for analog beam training; and
 receiving, from the second wireless communication device, feedback that indicates a first complex correlation coefficient associated with the second wireless communication device that is based at least in part on the set of beamformed reference signals and that represents:
  a phase between a first beamforming vector used for beamforming at the second wireless communication device based at least in part on a first beamformed reference signal of the set of beamformed reference signals and a second beamforming vector used for beamforming at the second wireless communication device based at least in part on a second beamformed reference signal of the set of beamformed reference signals; and
  an angle between the first beamforming vector and the second beamforming vector.

34. The method of claim 33, wherein the feedback further indicates a first signal strength associated with a first beam pair and a second signal strength associated with a second beam pair, wherein the feedback further indicates beam information associated with the first beam pair and the second beam pair.

35. The method of claim 34, further comprising:
 determining a signal strength threshold based at least in part on the first complex correlation coefficient, a second complex correlation coefficient associated with the second device, the first signal strength, the second signal strength, and the beam information; and
 determining an occurrence of a rank switch trigger event based at least in part on determining that an operating signal strength satisfies the signal strength threshold.

36. The method of claim 35, further comprising:
 determining an occurrence of a rank switch trigger event based at least in part on determining that an operating signal strength satisfies the signal strength threshold.

37. The method of claim 36, wherein the signal strength threshold comprises a transition signal-to-noise ratio.

38. The method of claim 36, further comprising:
 transmitting, to the second wireless communication device, an indication of a rank switch from a first rank operating mode to a second rank operating mode, wherein the rank switch is based at least in part on determining the occurrence of the rank switch trigger event.

39. The method of claim 38, wherein the first rank operating mode corresponds to rank two transmissions and the second rank operating mode corresponds to rank four transmissions, or the first rank operating mode corresponds to rank four transmissions and the second rank operating mode corresponds to rank two transmissions.

40. The method of claim 38, further comprising:
 transmitting, to the second wireless communication device, an enhanced beam training configuration that indicates an additional set of beamformed reference signals for beam training associated with the second rank operating mode.

41. The method of claim 38, further comprising:
 determining a realizable data rate associated with the second rank operating mode; and
 scheduling the second wireless communication device and at least a third wireless communication device based at least in part on the realizable data rate.

42. The method of claim 36, wherein determining the occurrence of the rank switch triggering event comprises:
 determining the occurrence of the rank switch triggering event based at least in part on at least one codebook indicated by a wireless communication standard.

43. The method of claim 33, wherein the first wireless communication device comprises a user equipment, a customer premises equipment, a base station, a relay node, an integrated access and backhaul node, or a repeater node with configurable beamforming capabilities.

44. The method of claim 33, wherein the second wireless communication device comprises a user equipment, a customer premises equipment, a base station, a relay node, an integrated access and backhaul node, or a repeater node with configurable beamforming capabilities.

* * * * *